United States Patent [19]

Matsuda

[11] Patent Number: 4,661,848

[45] Date of Patent: Apr. 28, 1987

[54] METHOD AND APPARATUS FOR CLEANING OF PIPES

[76] Inventor: Shinichi Matsuda, 32-14, Higiriyama 1-chome, Konan-ku, Yokohama, Kanagawa 233, Japan

[21] Appl. No.: 813,612

[22] Filed: Dec. 26, 1985

[30] Foreign Application Priority Data

Sep. 25, 1985 [JP] Japan ............................... 60-210093

[51] Int. Cl.[4] .......................... B08B 9/06; H04N 7/18

[52] U.S. Cl. ........................................ 358/100; 15/3.5

[58] Field of Search ............................ 368/100; 15/3.5

[56] References Cited

U.S. PATENT DOCUMENTS

| | | | |
|---|---|---|---|
| 2,371,176 | 3/1945 | Kirk | 358/100 |
| 3,139,704 | 7/1964 | McCune | 15/3.5 |
| 3,168,909 | 2/1965 | Zurbrigen | 358/100 |
| 3,832,724 | 8/1974 | Duval | 358/100 |
| 4,107,738 | 8/1978 | Van Norman | 358/100 |

*Primary Examiner*—Howard W. Britton

*Attorney, Agent, or Firm*—Oblon, Fisher, Spivak, McClelland & Maier

[57] ABSTRACT

The present invention relates to a method and an apparatus for cleaning a pipe. The apparatus is constructed by connecting a grinding device which has an election pipe which is connected to an abrasive material supplying hose and ejects the abrasive material against the inner surface of the pipe, an electric motor for rotating the ejection pipe, a video signal device having a television camera, and an ejection device connected to a dust discharge air supplying hose for ejecting the air forwardly, in the stated order and in a line so as to be passed through the pipe. The apparatus is advanced in the pipe by pulling on the abrasive material supplying hose and is able to be moved rearwardly by pulling on the dust discharge air supplying hose.

2 Claims, 9 Drawing Figures

3
3
10
12
13
14
15
16
17
18
20
23
25
26
31
32
33
34
35
36
37
38
40
41
42
43
45
90
91

METHOD AND APPARATUS FOR CLEANING OF PIPES

FIELD OF THE INVENTION

This invention relates to a method and an apparatus for cleaning pipes, and more particularly relates to a method and an apparatus which are suitable for cleaning pipes having comparatively large inner diameters thereof, such as 100 mm to 800 mm, for example.

BACKGROUND OF THE INVENTION

In the prior arts shown in U.S. Pat. No. 3,139,704 or Japanese non-examined patent publication No. 50-1552, for example, apparatuses for cleaning pipes which feed the abrasive material such as sand or the like through the pipe by air flow produced from compressed air with rotational movement or without rotational movement are used. But, in case of the inner diameter of a pipe is large, a large quantity of the compressed air and the abrasive material are consumed and a large cost is needed. Therefore, the inventor of the present invention has suggested a cleaning apparatus of a pipe which has a scratching device and a grinding device shown in U.S. patent application Ser. No. 715,961, filed Mar. 26, 1985, now U.S. Pat. No. 4,622,709. The grinding device is moved with the scratching device in the pipe and grinds the inner surface of the pipe by ejecting abrasive material such as sand or the like using compressed air. But, the grinding device can not make repeated movements by observing the grinding condition, therefore perfect and quick grinding can not be obtained. and it is not suitable to discharge the dust such as the used abrasive material and the removed deposits from the inner surface of the pipe, because the scratching device is connected to the grinding device.

OBJECT OF THE INVENTION

One object of the present invention is to provide a method and an apparatus for cleaning a pipe which enable to observe the cleaning condition of the inner surface cleaned by ejecting abrasive material using compressed air and to grind repeatedly the inner surface of the pipe by moving rearwardly, if necessary, for obtaining quick and perfect cleaning of the pipe, and to enable one to discharge effectively the dust such as the used abrasive material and the removed deposits or the like, and enable one to make a compact structure.

SUMMARY OF THE INVENTION

The present invention provides a method for cleaning a pipe comprising steps of connecting a grinding device having an ejection pipe which is connected to an abrasive material supplying hose for supplying the abrasive material by compressed air and ejecting the abrasive material against the inner surface of the pipe, an electric motor for rotating the ejection pipe, a video signal device which has a television camera for delivering a video signal of the cleaned condition of the inner surface of the pipe to the outside, and an ejection device which is connected to a dust discharge air supplying hose connected to a compressed air source for ejecting air in the direction of the video signal device, in the stated order and in a line through the pipe for construction of an apparatus, and cleaning the pipe by pulling on the abrasive material supplying hose for advancing the apparatus, wherein the apparatus is movable rearwardly by pulling on the dust discharge air supplying hose.

The present invention also provides an apparatus for cleaning a pipe having a grinding device which has an ejection pipe for ejecting abrasive material by compressed air fed from an abrasive material supplying hose against the inner surface of the pipe, an electric motor for rotating the ejection pipe of the grinding device, a video signal device which has a television camera for taking a video signal of the cleaned condition of the inner surface of the pipe and delivering the video signal to the outside, and a discharge means for discharging the dust such as the used abrasive material from the grinding and the removed deposits from the inner surface of the pipe or the like. The apparatus is specialized in that, the grinding device is connected to the abrasive material supplying hose which extends forwardly, the electric motor follows the grinding device and rotates the ejection pipe by means of at least one shaft, the video signal device is disposed rearwardly of the electric motor, the television camera takes a video signal of the condition of the pipe toward the region of the electric motor, and the discharge means includes an ejection device which is disposed rearwardly of the video signal device and ejects air in the direction of the video signal device, and a dust discharge air aupplying hose which extends rearwardly from the ejection device is connected to a compressed air source. The apparatus is able to be advanced by pulling on the abrasive material supplying hose and to be moved rearwardly by pulling on the dust discharge air supplying hose.

BRIEF DESCRIPTION OF DRAWINGS

Other objects, features, and attendant advantages of the present invention will be more clear by following description referring to accompanying drawings, wherein.

DETAILED DESCRIPTION

Figures 1, 2, 3:
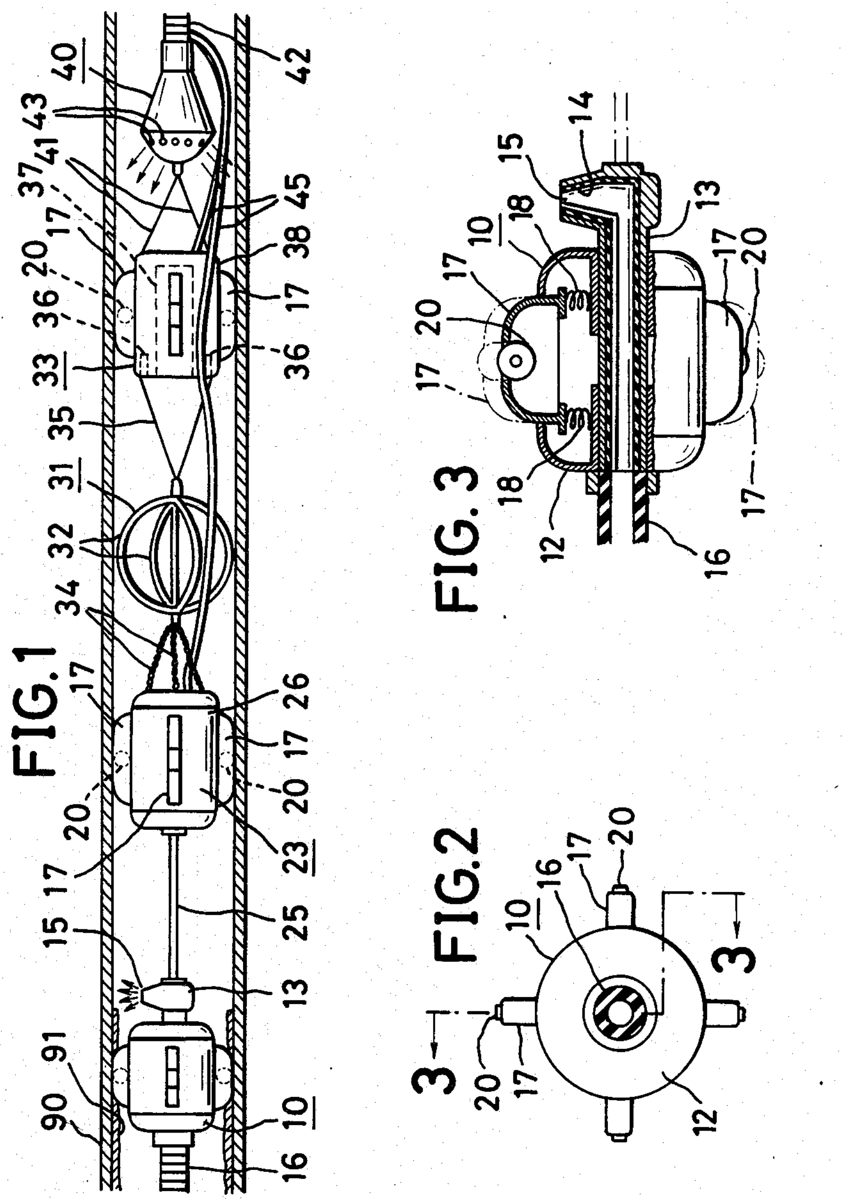
FIG. 1 is a side view of an embodiment of the present invention.
FIG. 2 is a front view of a grinding device shown in enlarged scale.
FIG. 3 is a sectional view taken along the line 3—3 in FIG. 2.
Figure 5:
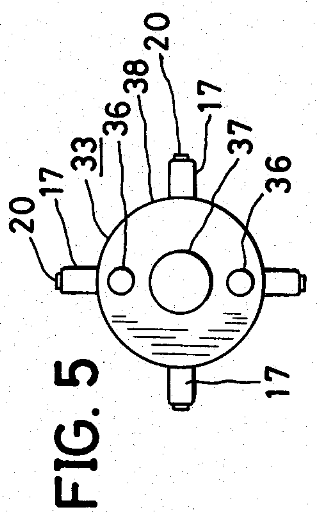
FIG. 5 is a front view of a video signal device shown in enlarged scale.
Figure 4:
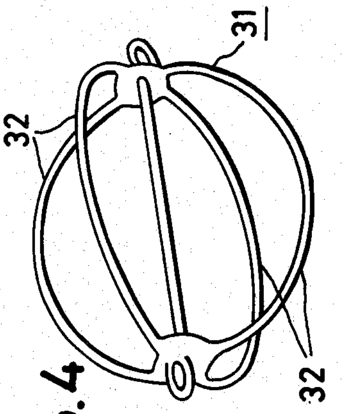
FIG. 4 is a perspective view of a guide frame.

In an embodiment of the present invention shown in FIGS. 1-6, 90 designates a pipe which is to be cleaned and to which is attached various deposits 91 such as rust or the like, to the inner surface thereof. A pair of vertical bores 92, 93 are formed in the earth at both ends of the pipe for cutting the connection with the both sides of the pipe 90. It is desired to remove initially large amounts of rust or the like using a scratching device which will be described below, but the scratching device may not be used.

A grinding device 10 is disposed at the front end of the apparatus and has a casing 12. An ejection pipe 13 is radially elongated from the rear portion of the casing and has an ejection port 15 at the end thereof. The ejection pipe has a rubber member 14 which covers the inner surface of the ejection pipe and reduces the damage caused to the inner surface of the ejection pipe more than one made of steel or the like. An abrasive material supplying hose 16 for supplying the abrasive material such as sand or the like is connected to the ejection pipe 13 in the casing 12 so as to allow the rotation of the injection pipe at the rear end thereof and extends forwardly from the grinding device 10. A plurality of guide members 17 are installed to the casing 12, each of which is able to project outwardly by two coil springs 18 and has a wheel 20 at central portion thereof. Therefore, the guide member 17 is outwardly projected and the grinding device 10 is able to be disposed at the central portion of the pipe 90 and is not inclined by a large angle.

A variable speed electric motor 23 rotates the ejection pipe 13 of the grinding device 10 by a flexible shaft 25 at 100 to 150 r.p.m., and has a casing 26 which has guide members 17 and wheels 20, each of the guide members 17 being outwardly projected by (not shown) coil springs similar to the ones of the grinding device 10. The rotational velocity of the ejection pipe 13 by the motor is able to be adjusted owing to the condition of the deposits 91 at the inner surface of the pipe 90, so as to become slow in case of hard deposits or quick in case of small deposits, for example. The motor 23 is controlled by a wireless signal from the outside. The flexible shaft 25 may be changed to a pair of shafts connected by a universal joint, for example. It is desirable to space the axes of the both ends of the shaft or shafts, if necessary.

A guide frame 31 is connected by a plurality of chains 34 which are flexible connectors to the motor 23 at the rear position thereof, and has four bent portions 32, each of which is made of a slender elastic metal bar. A video signal device 33 is connected by wire ropes 35 hung from the guide frame 31 is disposed at central portion of the pipe 90, and has a pair of electric lights 36 to light forwardly and a television camera 37 which takes a video signal of the grinded condition of the inner surface of the pipe 90 in the forward direction and delivers the video signal to the outside. A casing 38 of the video signal device 33 also has guide members 17 and wheels 20, each of the guide members is outwardly projected by (not shown) coil springs in the same manner as with the grinding device 10.

An ejection device 40 is connected by wire ropes 41 which are flexible connectors to the video signal device 33 at a rear position thereof, and receives compressed air from a dust discharge air supplying hose 42 which is connected at a rear portion of the ejection device and ejects air from a plurality of openings 43 in the direction of the video signal device 33 so that the dust of the used abrasive material for grinding and the removed deposits or the like is forwardly discharged. Electric wires 45 connected to the motor and the video signal device 33 are embedded in the hose 42.

Figure 6:
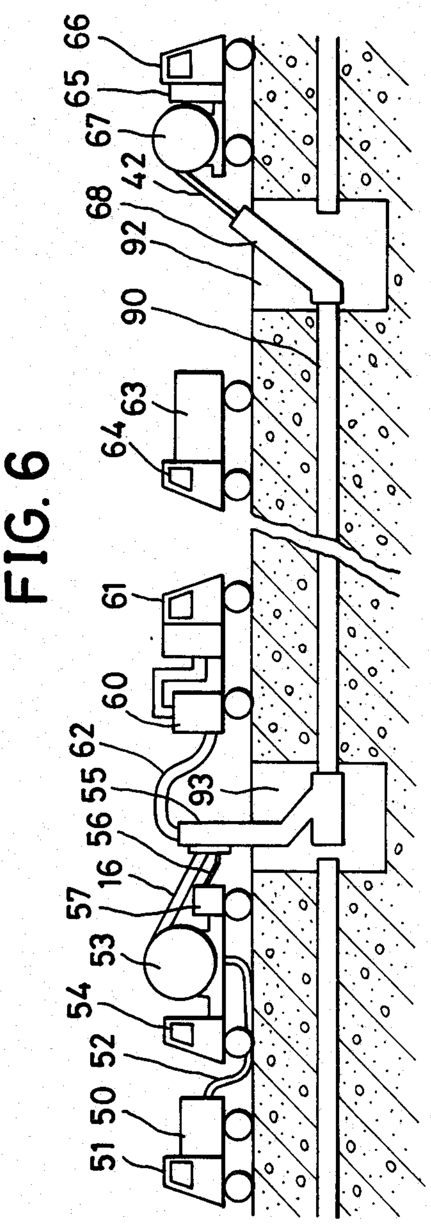
FIG. 6 is a side view of devices disposed at out of a pipe for cleaning thereof partially cut away.

Referring now to FIG. 6, devices which are disposed outside of the pipe 90 are shown. An abrasive material supplying device 50 supported on a car 51 feeds the abrasive material such as sand or the like passing through a hose 52 by compressed air from a (not shown) compressor. A hose winding device 53 which winds the hose 16 is supported on a car 54. The abrasive material fed from the hose 52 is supplied into the wound portion of the hose 16 at the hose winding device. The hose 16 passes through an attached pipe 55 which is connected to the front end of the pipe 90. In case of the winding up of the hose 16, the portion of the apparatus from the grinding device 10 to the hose 42 is advanced, and in case of the pulling of the hose 42, the hose 16 is unwound and the portion of the apparatus from the grinding device 10 to the hose 42 is rearwardly moved. 56 designates a wire rope which is wound by a winch 57 supported on the car 54. A dust collector 60 is disposed on a car 61 and is connected to the upper end of the attached pipe 55 by means of a hose 62. Therefore, the dust composed of the abrasive material used for the grinding in the pipe 90 and the removed deposits or the like is suctioned by vacuum and removed, and only the air is discharged. A dynamo 63 is supported on a car 64 and supplies electric current to various portions. A compressor 65 is installed on a car 66. A hose winding device 67 is installed on the car 66 so as to wind the hose 42 and supplies the compressed air fed from the compressor 65 to the hose 42. An attached pipe 68 is connected to the rear end of the pipe 90 for passing the hose 42 therethrough.

Figure 7:
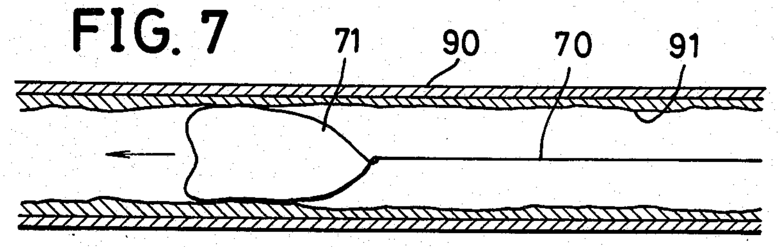
FIG. 7 is a side view showing a wire passing work.
Figure 8:
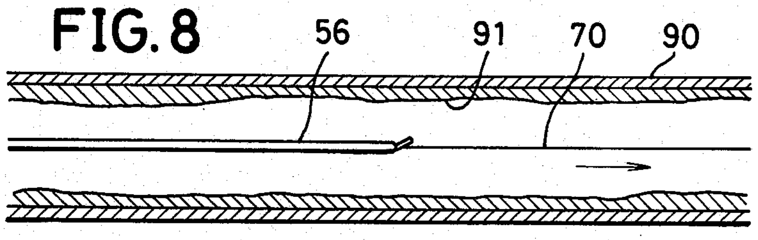
FIG. 8 is a side view showing a wire rope pulling work.
Figure 9:
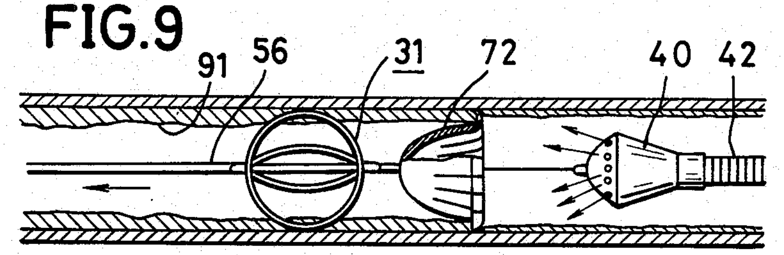
FIG. 9 is a side view showing a scratching work.

In FIGS. 7-9, preparation for the use the above described apparatus is shown. In FIG. 7, a bag 71 inflated by air and fixed to one end of a wire 70 which is unwound from a (not shown) winch is advancing in the pipe 90 by supplying air from one end of the pipe using the ejection device 40, for example, so as to reach to the other end of the pipe. In this case, the attached pipe 55 is removed from the end of the pipe 90. The wire rope 56 passed through the attached pipe 55 is tied with the wire 70 and is pulled in the reverse direction as shown in FIG. 8 so as to get the end thereof at the other end of the pipe 90. Referring to FIG. 9, then the attached pipe 55 is connected to the pipe 90, and a scratching device 72 is connected to the end of the wire rope 56 by means of the guide frame 31, and the ejection device 40 with the hose 42 is connected to the scratching device, and all of these are moved in the direction as shown by an arrow head. In this case, compressed air is supplied from the hose 42 and the dust collector 60 suctions the air so that the removed deposits 91 in the pipe 90 are discharged. The scratching device 72 is made of an elastic metal plate and is forwardly projected and backwardly concaved and has branched peripheral portions which annularly contact all of the inner surface of the pipe 90 and scratch large deposits 91 therefrom. Then, the hose 16 is connected to the guide frame 31, and the guide frame 31 is connected to the ejection device 40 connected to the hose 42, and the hose 42 is wound so as to be pulled to the right direction, although such condition is not shown. At the right end of the pipe 90, the grinding device and other devices of the apparatus are connected as shown in FIG. 1.

In use of the apparatus of the present invention shown in FIG. 1, the abrasive material is supplied by the compressed air to the grinding device 10 and is ejected against the inner surface of the pipe 90 from the ejection pipe 13 while the hose 16 is slowly wound, and the motor 23 is controlled from the outside so as to rotate the ejection pipe 13 with suitable rotating velocity, and compressed air is supplied to the ejection device 40 through the hose 42 and the compressed air is ejected from the opening 43 while the hose 42 is slowly unwound, and the dust collector 60 suctions the air and the dust in the pipe 90. The grinding condition is observed by a (not shown) video monitor which receives the video signal from the television camera 37 by the electric wires 45, therefore the apparatus can be moved in a reverse direction and grind repeatedly when an imperfect grinding portion has been found, thus the work can be quickly finished. The video signal from the television camera 37 is recorded for use to report to the client.

The present invention as described above has the following advantages. By observing the cleaning condition in the pipe 90 using the video signal device 33, the apparatus can be advanced by pulling on the hose 16 which supplies the abrasive material and can be easily moved in a reverse direction by pulling on the hose 42 which supplies the compressed air, therefore the inner surface of the pipe 90 is able to be quickly and perfectly cleaned, the produced dust can be effectively discharged by the ejection device 40 which is moved with the grinding device 10, and the apparatus is able to have a compact structure as a whole.

The foregoing is of course considered as illustrative only of the principle of the invention. Obviously, numerous modification are possible in light of the above teachings.

I claim:

1. A method for cleaning a pipe comprising the steps of:

linearly connecting in a pipe to be cleaned a grinding device having a rotatable ejection pipe which is connected to a compressed air abrasive material supplying hose, an electric motor for rotating said ejecting pipe, a video signal device having a television camera, and an air ejection device connected to a dust discharge compressed air supplying hose, cleaning said pipe by discharging abrasive material against an inner surface of said pipe from said ejection pipe while advancing said apparatus and using said electric motor to rotate said ejection pipe;

simultaneously using said video signal device for viewing the cleaned pipe, using said air ejection device for ejecting air towards said video signal device, and moving said apparatus backward by pulling said dust discharge compressed air supplying hose.

2. An apparatus for cleaning a pipe, comprising:

a grinding device including rotatable compressed air ejection pipe means for ejecting abrasive material against an inner surface of a pipe, electric motor means for rotating said ejection pipe means of said grinding device, video signal means including a television camera for taking a video signal of the cleaned condition of the inner surface of the pipe and delivering said video signal to the outside of said pipe, and discharge means for discharging dust from said inner surface of the pipe, wherein said grinding device is forwardly connected to an elongated abrasive material supplying hose, wherein said electric motor means follows said grinding device and rotates said injection pipe means by means of at least one shaft, wherein said video signal means is disposed behind said electric motor means, wherein said television camera is positioned to take a video signal of the condition of the pipe adjacent said electric motor, and wherein said discharge means includes:

(a) an ejection device disposed behind said video signal means and positioned for ejecting air toward said video signal means (b) a dust discharge air supplying hose connected to a rearward part of said ejection device, whereby said apparatus for cleaning the pipe may be advanced by pulling said abrasive material supplying hose and may be moved backwardly by pulling said dust discharge air supplying hose.

* * * * *